United States Patent [19]
Vice

[11] Patent Number: 5,416,792
[45] Date of Patent: May 16, 1995

[54] PREHEAT SYSTEM

[75] Inventor: David E. Vice, 2917 Newman St., Ashland, Ky. 41101

[73] Assignees: Richard H. Logan, Fairfield, Ohio; David E. Vice, Ashland, Ky.

[21] Appl. No.: 148,841

[22] Filed: Nov. 5, 1993

[51] Int. Cl.⁶ .............................................. F27D 13/00
[52] U.S. Cl. ........................ 373/80; 373/43; 373/78
[58] Field of Search .............. 373/78, 79, 80, 18, 373/20, 21, 8, 9, 42, 43; 432/103, 9, 179, 10; 75/28, 43, 44 S, 433, 10.36; 266/44, 157

[56] References Cited

U.S. PATENT DOCUMENTS

| | | | |
|---|---|---|---|
| 588,267 | 8/1897 | Chalmot | 373/80 |
| 4,280,836 | 7/1981 | Maeda | 75/12 |
| 4,395,280 | 7/1983 | Takenouchi et al. | 75/433 |
| 4,470,804 | 9/1984 | Geijer et al. | 432/9 |
| 4,506,370 | 3/1985 | Yoshimatsu | 373/80 |
| 4,543,124 | 9/1985 | Vallomy | 75/46 |
| 4,611,339 | 9/1986 | Saitoh | 373/80 |
| 4,653,065 | 3/1987 | Seki et al. | 373/80 |
| 4,736,383 | 4/1988 | Meierling | 373/78 |

FOREIGN PATENT DOCUMENTS

4138118 of 1993 Germany.

*Primary Examiner*—Bruce A. Reynolds
*Assistant Examiner*—Tu Hoang
*Attorney, Agent, or Firm*—Camoriano & Smith

[57] ABSTRACT

A furnace preheat system uses furnace off-gas to preheat material to be charged into the furnace. In a preferred embodiment of the invention, first and second angularly-spaced preheat vessels are mounted on a rotatable member which rotates them to a position over the furnace for charging the furnace and to a position for preheating the material in the preheat vessels. There is ductwork from the furnace to the first and second preheat vessels to selectively vent the off-gases to the first and second preheat vessels.

19 Claims, 10 Drawing Sheets

FIG. 6  MODE A

FIG. 7  MODE B

FIG. 8 MODE C

FIG. 9 MODE D

FIG. 10 — MODE E

FIG. 11 — MODE F

PREHEAT SYSTEM

BACKGROUND OF THE INVENTION

The present invention relates to furnaces, and, in particular, to a system for preheating material before it enters the furnace, using the off-gas from the furnace as the heating source.

Heating and melting furnaces, and in particular electric arc furnaces, are used to heat or melt various materials. Electric arc furnaces pass an electric arc (current) through ferrous metallic, non-ferrous metallic, and non-metallic scrap or other feed stock in order to melt the scrap.

During this production process, large quantities of very hot particulate-laden gases are generated. These gases create a problem, in that they are very hot, abrasive, difficult to handle, and they cannot be vented directly into the environment, due to the particulate material in them. These gases are usually drawn out of the furnace through a hole in the furnace roof. Ambient air or oxygen is introduced into the gas stream to allow ignition of any combustible gases or particulate materials. The gases are cooled, usually by passing through water-cooled ductwork, and are filtered through a baghouse, scrubber, precipitator, or other device with the function of collecting the particulate matter prior to discharge of the gas into the atmosphere.

If these off-gases can be used to preheat material to be charged into the furnace, several problems can be solved at once. First, the amount of time and energy required to melt the materials in the furnace can be reduced, resulting in considerable cost savings in the production process. Second, since the off-gases are cooled as they are used in the preheat process, the extensive cooling systems can be eliminated or greatly reduced, saving considerable capital and operating expense. Third, some of the particulate matter becomes trapped in the scrap, thus reducing the waste material to be disposed from the dust collection device.

There are several systems in use or proposed which are intended to use the off-gases to preheat the material to be charged into the furnace, and there are problems with all the existing systems. Some systems for using the off-gas to preheat require a complete redesign of the production process and equipment. Some other systems are simply not compatible with normal furnace operations, because they do not permit good operating practices or for other reasons. Most of the existing systems are very maintenance-intensive and/or have high operating expenses. In many designs, only part of the gases pass through the material to be preheated, sharply reducing the efficiency of the system. In some designs, the preheater cannot be bypassed if maintenance problems occur, which is clearly an undesirable situation. Some systems require additional processing of materials, particularly scrap, prior to use, or are limited to certain specific types or sizes of scrap.

Some systems preheat the charging bucket containing the scrap each time the scrap is preheated. Because the bucket has a significant weight relative to the contents, much energy is wasted in heating the bucket. This heating of the bucket is also damaging to the bucket, increasing maintenance costs.

In many designs, a new load of material to be preheated cannot be prepared or placed in position until after the furnace begins the next production cycle. The preheater is therefore not "on-line" as soon as the furnace begins the melting process, thus losing the opportunity to use all the off-gas stream for preheating.

Because of the space required for the preheat system, it typically is not located in the immediate vicinity of the melting furnace. When the preheat station is located at some distance from the furnace, several problems result. First, the heated vessel must be moved by crane or other device through the operating area to the furnace, resulting in a loss of preheat temperature and the escape of irritating or toxic fumes into the air. Second, in order to transport the vessel to the furnace area in time to quickly charge the furnace when the furnace is shut off, the vessel must be removed from the preheat station prematurely, thus resulting in a loss of efficiency in the preheat process. Third, this movement of the vessel to the furnace by crane or other means is a double handling of the charging material, compromising normal operations. Fourth, due to the distance between the furnace and the vessel, much of the energy in the off-gas is lost before the gases reach the material to be preheated, resulting in a loss of efficiency and in only partial combustion of contaminants, such as oil, grease, plastics, and fibers, which produces an undesirable gas emission. Fifth, because the system is not near the furnace, great lengths of water-cooled ductwork are required to transport the gases to the preheating station, wasting energy and creating a large capital and maintenance expense.

The material to be charged into the furnace is usually scrap material that includes contaminants such as oils, greases, plastics, fibers, and water or ice. In the prior art, when the material is charged into the furnace, the residual heat in the furnace causes a flash ignition of these various combustible contaminants in the scrap, and a huge plume of flame and dust particles rises to the roof of the shop building. In most cases, large overhead canopies must be located above the furnace to capture this plume, which is then carried to the baghouse or other dust collecting device through ductwork attached to the canopies. These large canopies capture not only the plume, but also a very large volume of air from outside the furnace that travels up with the plume. This requires that the baghouse or other system for cleaning the air be sized very large to handle this large volume of air. Even with these overhead canopies and large air-cleaning systems, considerable dust remains in the air inside the building, which is undesirable. In some installations, separate enclosures are built around the furnace to capture charging emissions. Large doors are opened to permit a crane to place the charging bucket into the enclosure. The doors are closed, charging occurs, and the doors are opened to permit removal of the charging bucket. Use of such enclosures also requires that large volumes of air be collected to capture the charging emissions, although the air volume is somewhat less than that required for an overhead canopy system. Some collection of fugitive emissions in the roof area is still required. Such furnace enclosures are expensive, are easily damaged (particularly the large doors), and considerably disrupt efficient charging and operating practices.

SUMMARY OF THE INVENTION

The present invention provides a novel means and apparatus for preheating materials prior to charging the materials into a heating or melting furnace. By using the off-gas to preheat the materials, considerable savings are realized in energy costs. Since the material is preheated before entering the furnace, it can be heated or melted more quickly once it enters the furnace, permitting greater production through the furnace in a given period of time.

The present invention eliminates many problems of the prior art. The present invention places the material that is preheated very close to the furnace, allowing all of the gases from the furnace to pass through the material that is preheated very close to the furnace, thereby maximizing the energy transferred into the material to be preheated and greatly reducing the need for expensive water-cooled ductwork and attendant water systems. The present invention permits the off-gas to be used for preheating during the entire heating cycle, so no time or energy is lost. The present invention does not require modifications to the furnace itself or to current operating practices. No additional processing of scrap or other material to be preheated is required.

The present invention provides an additional benefit to a conventional electric arc furnace operation in that it provides for the dust collection system to remain connected by ductwork to the heating vessel throughout the charging process, thereby sharply reducing the escape of fumes into the shop during charging. This in turn sharply reduces the volume of air required to be captured by the overhead canopies, thus greatly reducing the amount of air that must be passed through a baghouse or other air-cleaning system. Therefore, the air-cleaning system can be made much smaller and less expensive. This results in considerable capital and operating cost savings.

DESCRIPTION OF THE PREFERRED EMBODIMENTS

Figure 1:
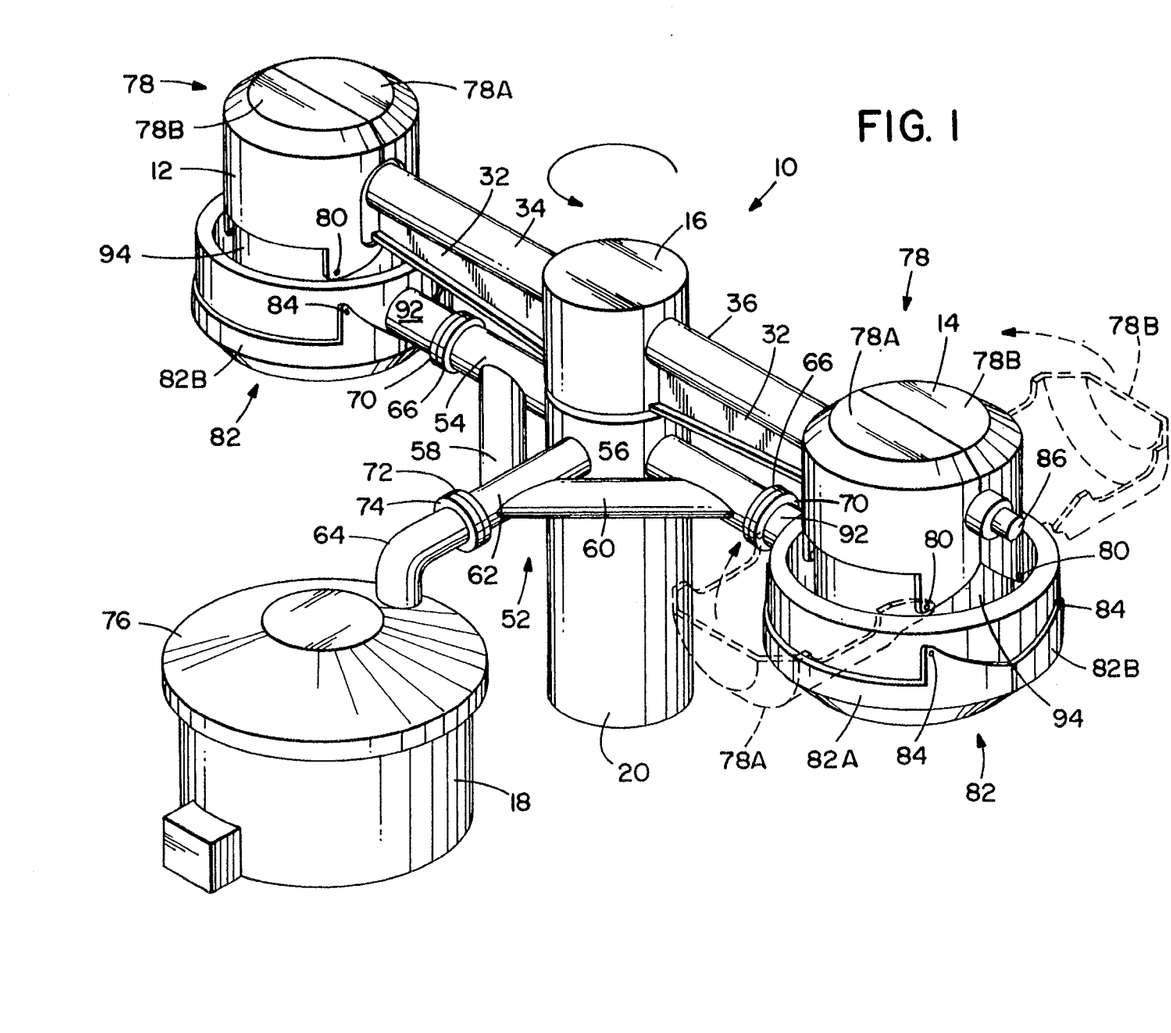
FIG. 1 is a perspective view of a furnace preheat system made in accordance with the present invention, with the first preheat vessel 12 located in the first preheat position.
Figure 2:
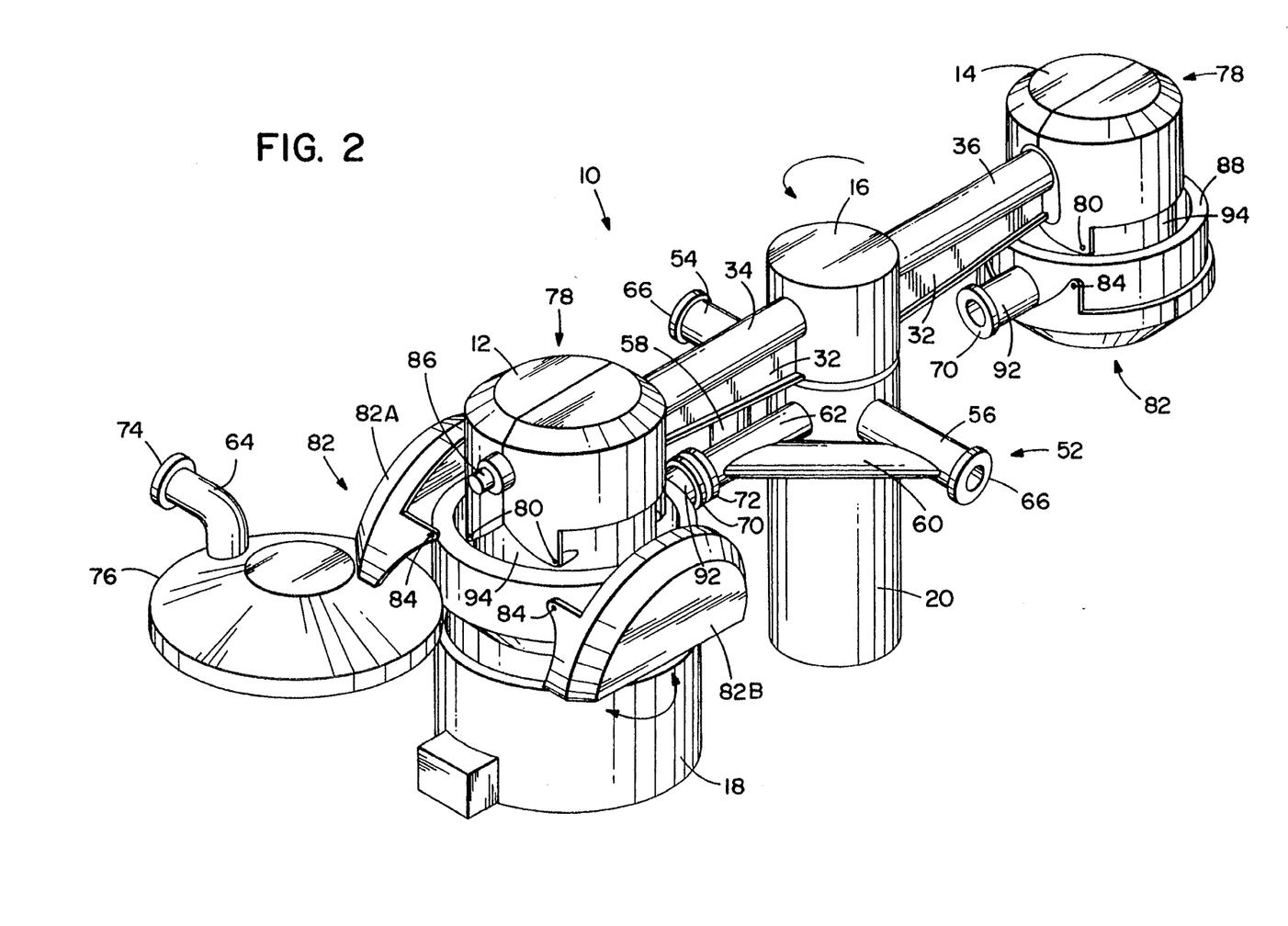
FIG. 2 is a perspective view of the furnace preheat system of FIG. 1 with the turret rotated 90° so the first preheat vessel can charge the furnace.
Figure 3:
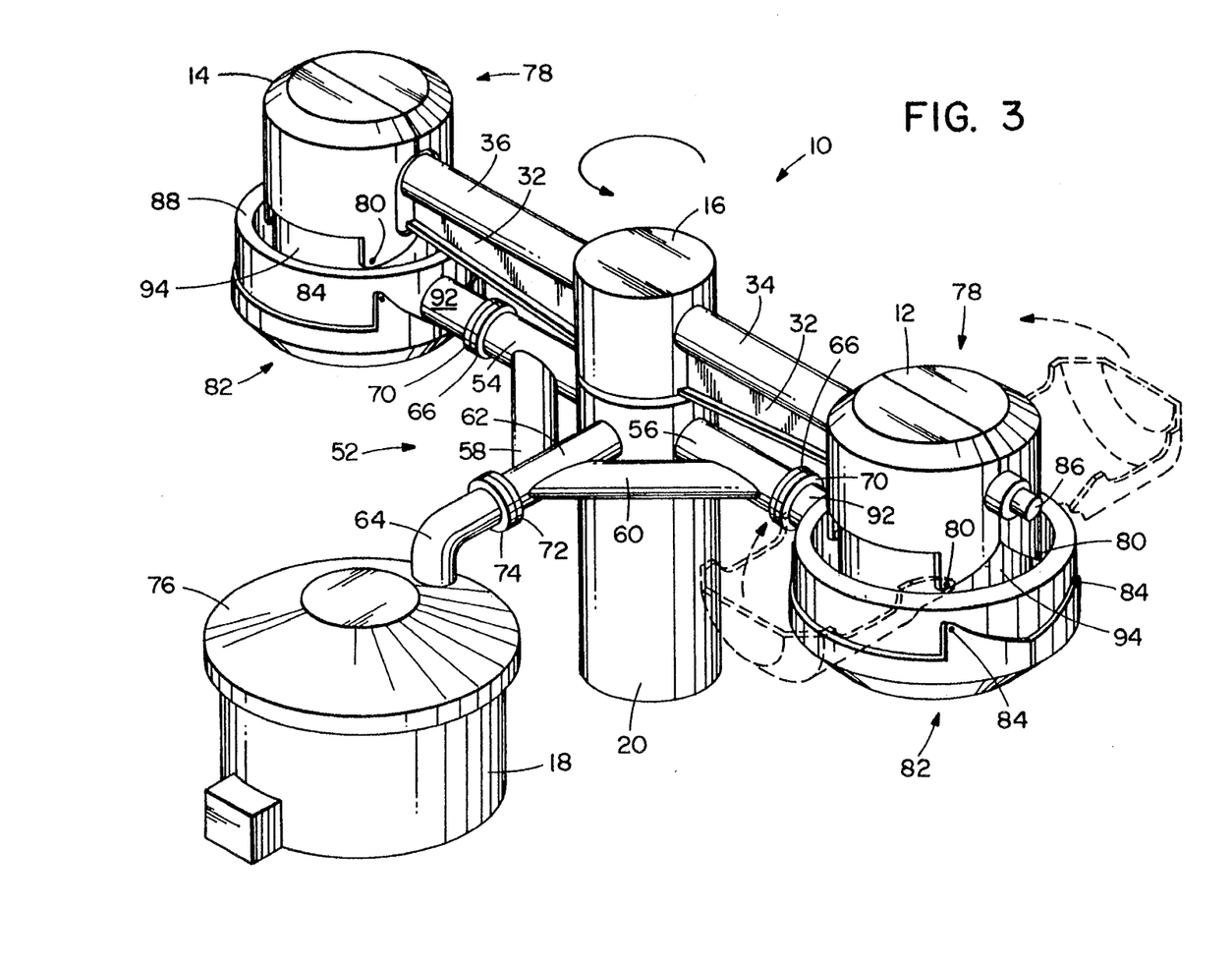
FIG. 3 is a perspective view of the furnace preheat system of FIG. 1 with the turret rotated 180°.
Figure 4:
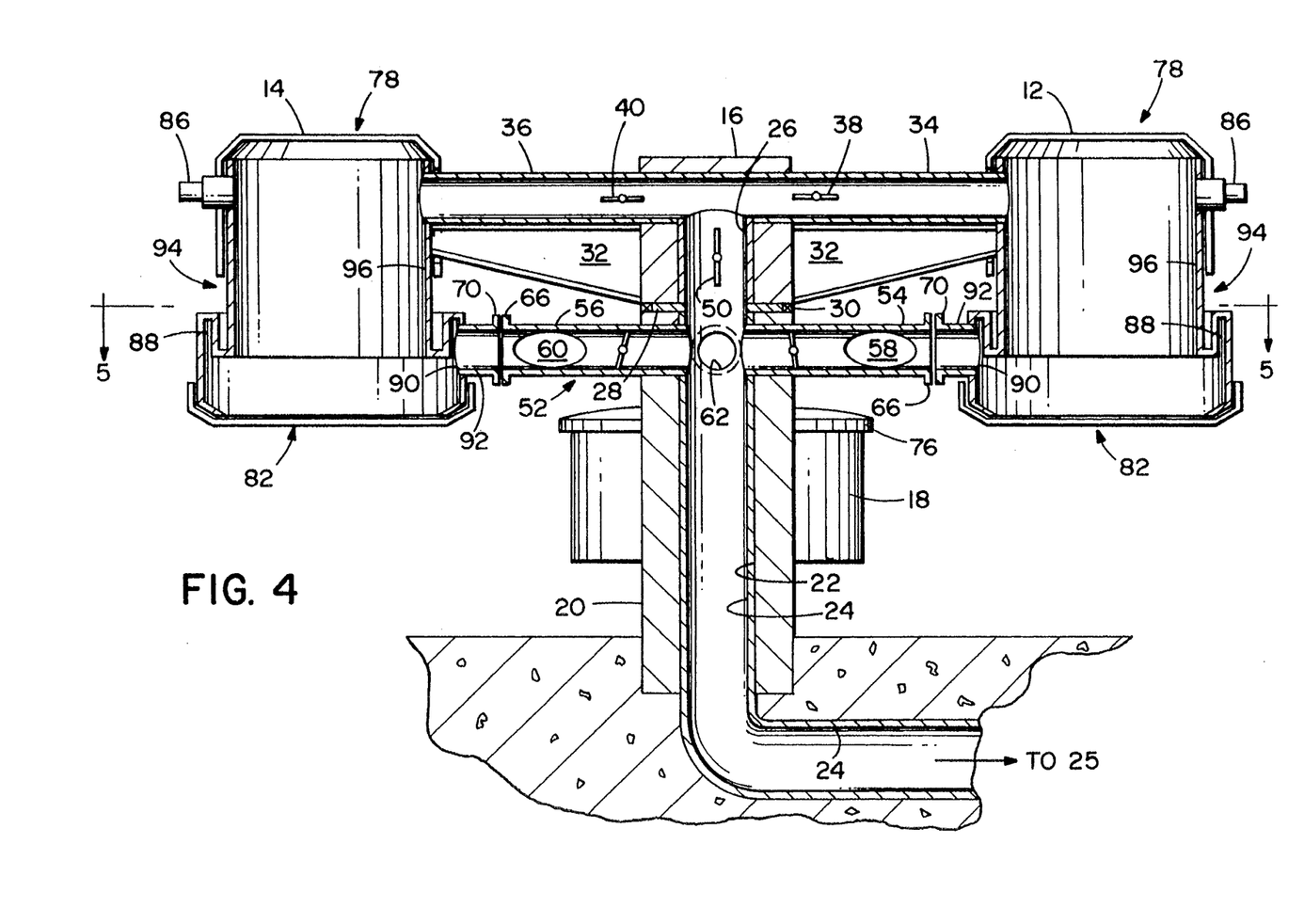
FIG. 4 is a back sectional view of the furnace preheat system shown in FIG. 1.
Figure 5:
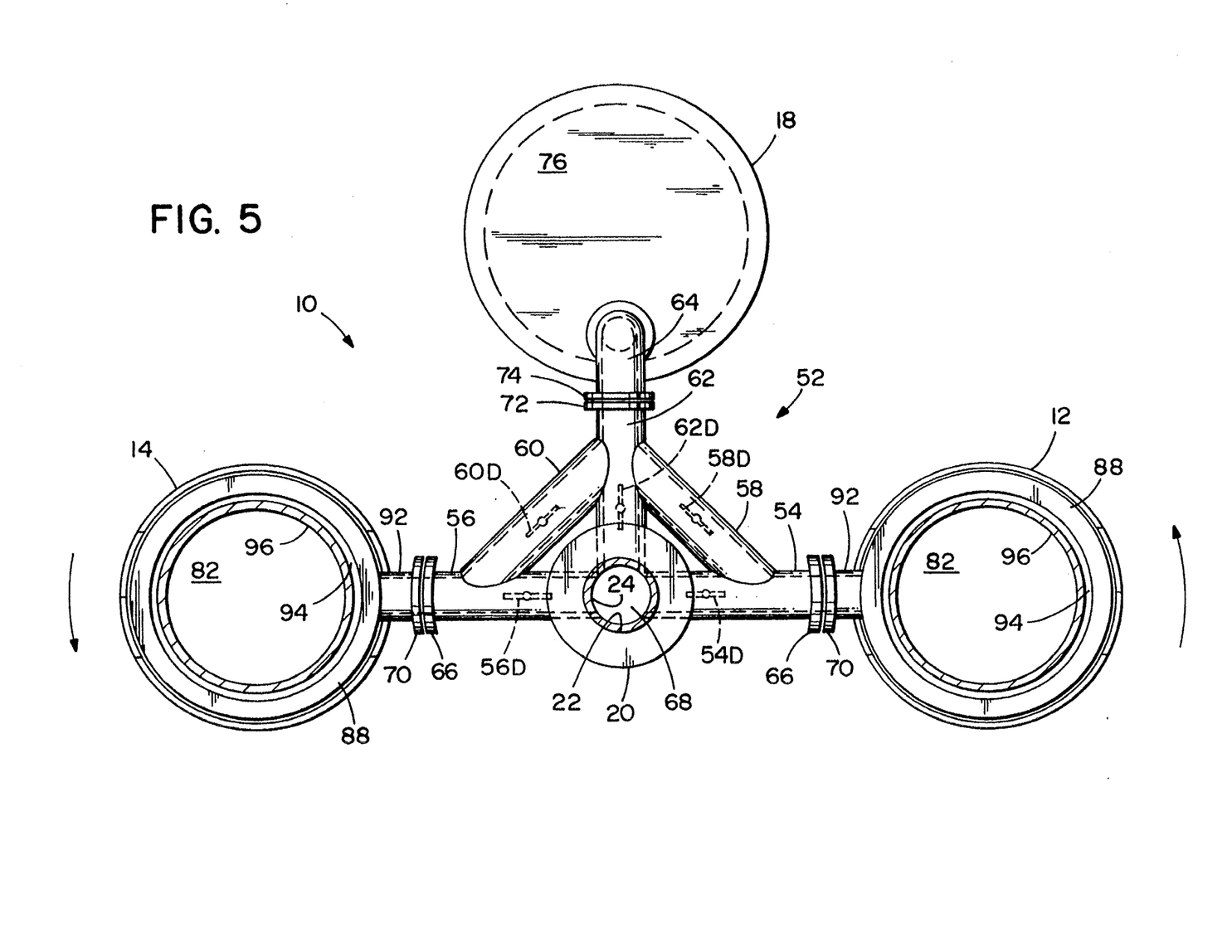
FIG. 5 is a view taken along the section 5—5 of FIG. 4.

As can be seen in FIGS. 1–5, the preferred embodiment of the invention is a furnace preheat system 10, which includes a first preheat vessel 12 and a second preheat vessel 14 mounted on a turret 16 adjacent to the heating or melting furnace 18. (The furnace may be an electric arc furnace 18 or other type of furnace.) In FIGS. 1, 4, and 5, the first preheat vessel 12 is located in the first preheat position, and the second preheat vessel 14 is located in the second preheat position.

Figure 13:
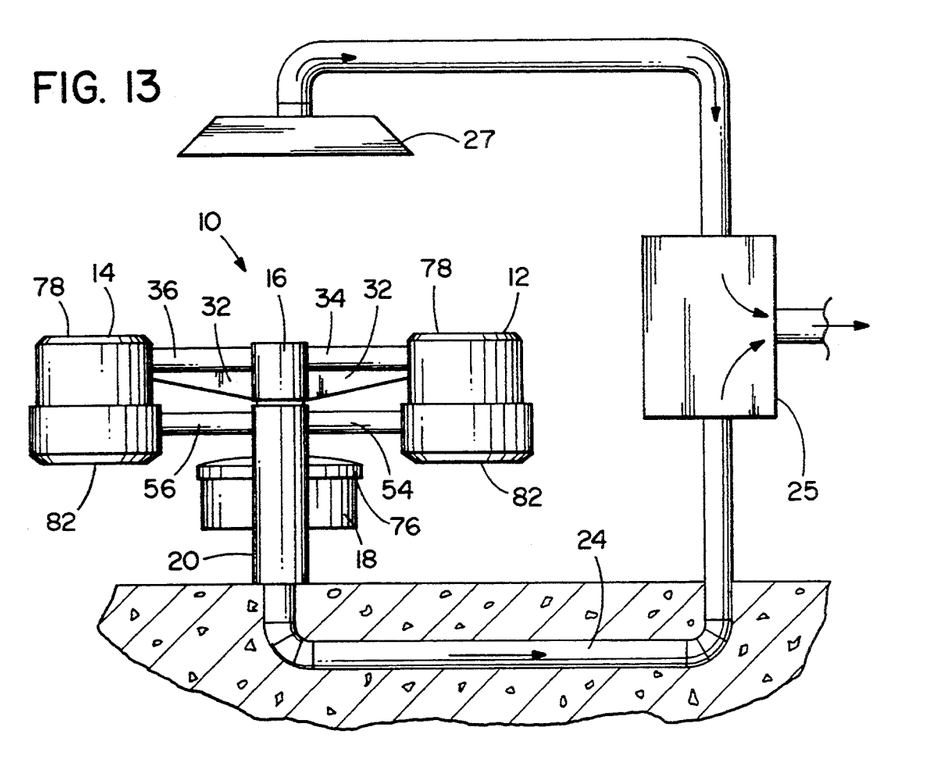
FIG. 13 is a schematic representation of the preheat system of FIG. 1, showing the canopy and the air treatment system.

Referring to FIGS. 1–4, the turret 16 is supported on a concrete or structural steel column 20, and is adapted to rotate relative to the column 20, as indicated by the arrow in FIG. 1. The column 20 has a substantially vertical cylindrical opening 22 in its center. A lower conduit portion 24 extends through that central vertical opening 22 in the column 20 and is fixed in the column 20. The top of the lower conduit portion 24 is aligned with an upper conduit portion 26, which defines a central opening in the turret 16. The lower conduit portion 24 extends out through the floor of the shop to a bag house or other known air pollution control device 25, as shown in FIG. 13. A blower (not shown) adjacent to the air pollution control device 25 pulls air through the air pollution control device 25, creating a low pressure (below atmospheric pressure) in the lower conduit portion 24 and in the ductwork in communication with the lower conduit portion 24, so that it pulls gases through the preheat system. This also means that, if there is a leak in any part of the ducting, it will draw in ambient air rather than leaking out furnace off-gas or gases from materials in the preheat vessels 12, 14.

The upper conduit portion 26 rotates with the turret 16, while the lower conduit portion 24 is stationary. Between the upper conduit 26 and the lower conduit 24 is a seal 28, preferably a labyrinth-type seal, which minimizes the infiltration of ambient air into the conduit at the point of connection. As shown in FIG. 4, there is also a bearing 30 between the turret 16 and the column 20 to support the weight of the turret 16 and to permit the turret 16 to rotate relative to the column 20.

The first and second preheat vessels 12, 14 are supported on the turret 16 by support arms 32. The first and second preheat vessels 12, 14 are angularly-spaced from one another so that, when the first preheat vessel 12 is over the furnace, the second preheat vessel 14 is in another position, not over the furnace. The preheat vessels 12, 14 may be removable from the turret 16. There is a first upper duct 34 which extends from the central opening 26 of the turret 16 into the upper portion of the first preheat vessel 12, and there is a second upper duct 36 which extends from the central opening 26 of the turret 16 into the upper portion of the second preheat vessel 14. As shown in FIG. 4, there is a damper or valve 38 in the first upper duct 34 and a damper or valve 40 in the second upper duct 36, which permit those ducts to be opened and closed.

Figure 14:
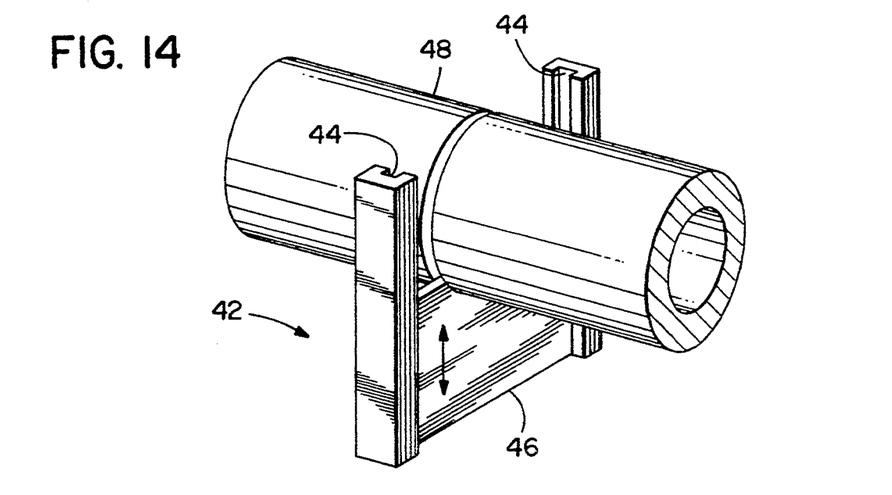
FIG. 14 is a perspective view of a preferred embodiment of one of the dampers of the preheat system of FIG. 1.

In the figures, those dampers 38, 40 and the other dampers in the preheat system 10 are shown as pivoting dampers for ease of illustration. However, in the preferred embodiment, these dampers would be sliding dampers, as shown in FIG. 14. The sliding damper 42 includes a pair of parallel, slotted tracks 44 and a flat, rectangular damper 46.which rides in those tracks 44. When the damper 46 slides up in the tracks 44, it slides up into a gap in the duct 48, closing off the duct 48, and, when it slides down in the tracks 44, it opens the duct 48. There may be tubing inside the rectangular damper 46 for water cooling (not shown), if necessary. This type of damper is well-known in the art.

The upper ducts 34, 36, the support arms 32, and the first and second preheat vessels 12, 14 rotate with the turret 16. As shown in FIG. 4, a turret damper 50 is located in the upper conduit portion 26 of the turret 16 and also rotates with the turret 16.

The fixed column 20 below the turret 16 includes a fixed ductwork system 52. The fixed ductwork system 52 includes a first lower duct 54. When a vessel is in the first preheat position, as the first preheat vessel 12 is in FIG. 1, the first lower duct 54 extends from the lower portion of the preheat vessel 12 into the lower conduit portion 24. The fixed ductwork system 52 also includes a second lower duct 56 which extends from the lower portion of a preheat vessel in the second preheat position into the lower conduit 24, as shown in FIGS. 1, 4, and 5.

The fixed ductwork system 52 also includes three forward ducts 58, 60, 62, which communicate with the furnace duct 64. These ducts are shown best in FIGS. 1 and 5. The furnace duct 64 is a standard part of the furnace 18 and is well-known in the art. The third forward duct 62 provides an enclosed path from the lower conduit 24 to the furnace duct 64. The first forward duct 58 provides an enclosed path from the first lower duct 54 to the third forward duct 62. The second forward duct 60 provides an enclosed path from the second lower duct 56 to the third forward duct 62. As shown in FIGS. 4 and 5, there are dampers in each duct of the fixed ductwork system 52. For ease of understanding, these dampers will be assigned the same number as the duct in which they are located, with the letter "D" following the number to indicate "damper". Thus, there is a damper 54D in the first lower duct 54, a damper 56D in the second lower duct 56, a damper 58D in the first forward duct 58, a damper 60D in the second forward duct 60, and a damper 62D in the third forward duct 62.

The first lower duct 54 includes a flange 66 which has a slight curvature, as shown in FIG. 5. The radius of curvature of the flange 66 is substantially the same as the horizontal distance between the center axis 68 of the column 20 and the flange 66. The flange 66 on the first lower duct 54 is aligned with a corresponding curved flange 70 on one of the preheat vessels 12, 14, when one of the preheat vessels 12 or 14 is in the first preheat position, as the first preheat vessel 12 is in FIGS. 1 and 5.

Similarly, the second lower duct 56, which is identical to the first lower duct 54, has a curved flange 66, which is aligned with a corresponding curved flange 70 on one of the preheat vessels 12, 14, when the preheat vessel 12 or 14 is in the second preheat position, as the vessel 14 is in FIGS. 1 and 5.

The third forward duct 62 also has a flange 72 which is aligned with the flange 74 on the furnace duct 64 when the furnace cover 76 is closed, as shown in FIGS. 1 and 5.

THE PREHEAT VESSELS

The first and second preheat vessels. 12, 14 are identical to each other. Both of the preheat vessels 12, 14 have a top 78, which is made up of two halves 78A and 78B, which pivot about pivot points 80 in order to open and close. In FIG. 1, there are phantom lines, partially broken away, showing the top 78 of the vessel 14 in the open position. The top 78 of a vessel 12 or 14 opens to be loaded with material to be preheated when the vessel is in the second preheat position (which is also the loading position), as will be described later.

Both of the preheat vessels 12, 14 also have a bottom 82, made in two halves 82A and 82B, which pivot about pivot points 84 in order to open. The bottom 82 of a vessel 12 or 14 opens when preheated material is dumped into the furnace, as shown in FIG. 2.

The preheat vessels 12, 14 also have a gas-powered burner 86 lying opposite the opening into their respective upper duct 34 or 36. The purpose of the burners 86 will be described later. It may be preferable for the burner 86 to be a stationary element located at the second preheat position and connecting with the vessels 12, 14 when they are located at the second preheat position, but, in this embodiment, the burners 86 are a part of the vessels 12, 14.

Both preheat vessels 12, 14 also have a circulation chamber 88, shown best in FIG. 4. The circulation chamber 88 is a hollow ring, which is refractory lined and which lies outside of the normal outer cylindrical dimension of the upper part of the vessel 12, 14. The outer edge of the circulation chamber 88 defines a duct opening 90 to a duct 92, which leads to the vessel flange 70. The inside of the circulation chamber 88 is the inside of the vessel 12 or 14. When material is loaded into the vessel 12 or 14 from the top, the material goes into the receptacle portion of the vessel, leaving the circulation chamber 88 substantially open for gas to circulate. This allows the preheat gases sufficient residence time for ignition and combustion of combustible materials in the gases and allows for a uniform distribution of the gases into the material to be preheated.

The entry of gases through the side opening 90 in the vessel 12, 14 allows a layer of material to cover the vessel bottom closures 82A, 82B, thereby preventing the bottom closures from being directly exposed to the hot gases from the furnace. Therefore, it is generally not necessary for the bottom closures 82A, 82B to be water cooled or refractory covered.

The inside of the main, cylindrical body of the vessels 12, 14 is not exactly cylindrical. While the taper is too small to be seen in the drawings, the inner wall 96 of the cylindrical body 94 of the vessels 12, 14 is tapered, having a slightly larger diameter at the bottom than at the top, to facilitate the discharge of preheated material out the bottom. The inner surface of the cylindrical body 94 is refractory lined. The refractory lining may be full or partial. The refractory material may be covered with a tough inner surface to protect the refractory from the impact of scrap as the vessel is loaded.

OPERATION OF THE SYSTEM

FIGS. 6–12 are schematic representations of the system at various stages of operation. They represent seven different modes of operation of the system. As will be explained later, the normal operation of the preheat system generally includes at least three of these modes of operation (a preheat mode, in which the furnace off-gas preheats material which is not yet in the furnace, a charging mode in which the furnace is charged, and a loading mode, in which the preheat vessel is loaded).

MODE A-SINGLE VESSEL OFF GAS PREHEAT

Let's start with the system in the position shown in FIG. 1, with the first preheat vessel 12 in the first preheat position, the second preheat vessel 14 in the second preheat position, and both vessels 12, 14 full of scrap material to be preheated. We will assume that the furnace 18 is operating to melt whatever is inside it and that the furnace off-gas is leaving the furnace 18 through the furnace duct 64.

There are several different ways the furnace off-gas can be routed through the system at this point. What is considered to be the preferred arrangement is shown in FIG. 6 and labelled as Mode A-a single vessel preheat mode.

Figure 6:
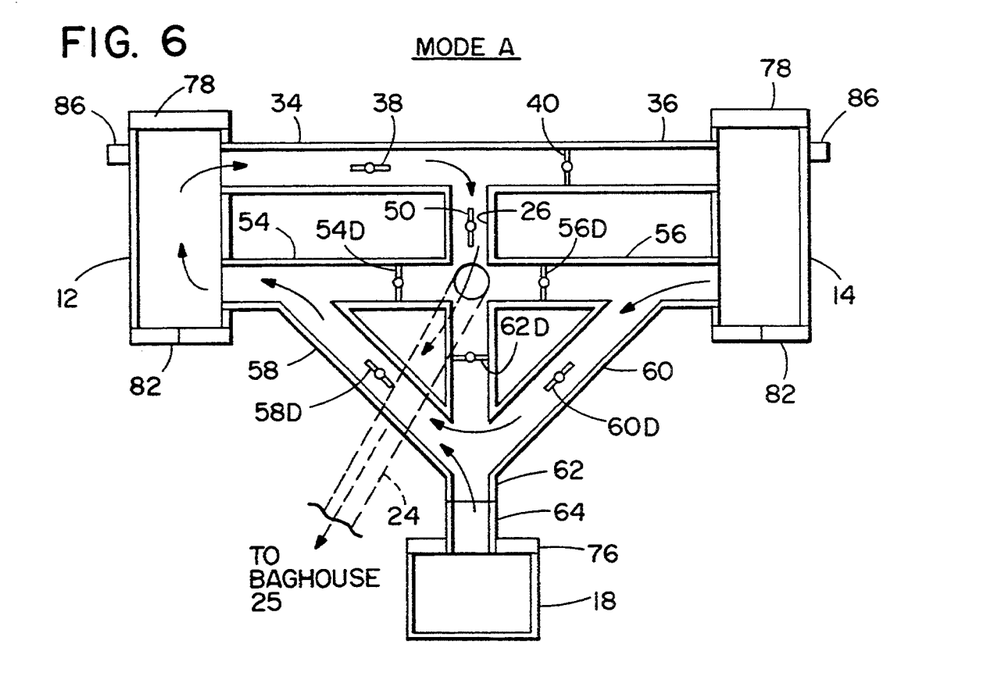
FIG. 6 is a schematic representation of the preheat system of FIG. 1, showing the damper positions for one preheat mode of operation.

As shown in FIG. 6, the dampers 38, 50, 58D and 60D are open. The other dampers are closed. The burner 86 on the second preheat vessel 14 is on, and the other burner 86, on the first preheat vessel 12, is off.

With the dampers in the arrangement shown in FIG. 6, the hot off-gas from the furnace 18 will enter the third forward duct 62, will go through the first forward duct 58 into the first lower duct 54, and then into the circulation chamber 88 of the first preheat vessel 12. The off-gas will flow up through the scrap in the first preheat vessel 12, heating that scrap, and will flow out of the first preheat vessel 12 through the first upper duct 34, into the upper conduit 26 of the turret 16, and out the lower conduit 24 to the air cleaning system 25. At the same time, the burner 86 in the second preheat vessel 14 is preheating the scrap in the second preheat vessel 14. This generates some gas as volatile materials vaporize. This gas leaves the second preheat vessel 14 through the bottom opening 90, flows through the second forward duct 60, through the first forward duct 58, and then travels with the furnace off-gas through the first preheat vessel 12, through the first upper duct 34, through the upper conduit 26, and out the lower conduit 24 to the air cleaning system 25. By passing the volatiles from the second preheat vessel into the off-gas stream, the hot off-gas from the furnace will ignite any partially-combusted material coming from the second preheat vessel 14. This prevents partially combusted gases from reaching the air cleaning system 25 and permits the energy of combustion of those volatiles to be used for preheating. At this point, the scrap in the first preheat vessel 12 is completely preheated., and the scrap in the second preheat vessel 14 is partially preheated. Now, the scrap in the first preheat vessel 12 needs to be charged into the furnace 18.

MODE B-CHARGING THE FURNACE

The furnace 18 discharges the melted material that is inside it by a known means (not shown). The top or cover 76 of the furnace 18 is pivoted to an open position, as is well-known in the art. (The present invention does not change the furnace design.) Then, the turret 16 is pivoted counterclockwise 90°, as shown by the arrow in FIG. 1, until the first preheat vessel 12 is directly over the furnace 18. Then, the bottom 82 of the first preheat vessel 12 opens as shown in FIG. 2, discharging the preheated scrap into the open top of the furnace 18.

Figure 7:
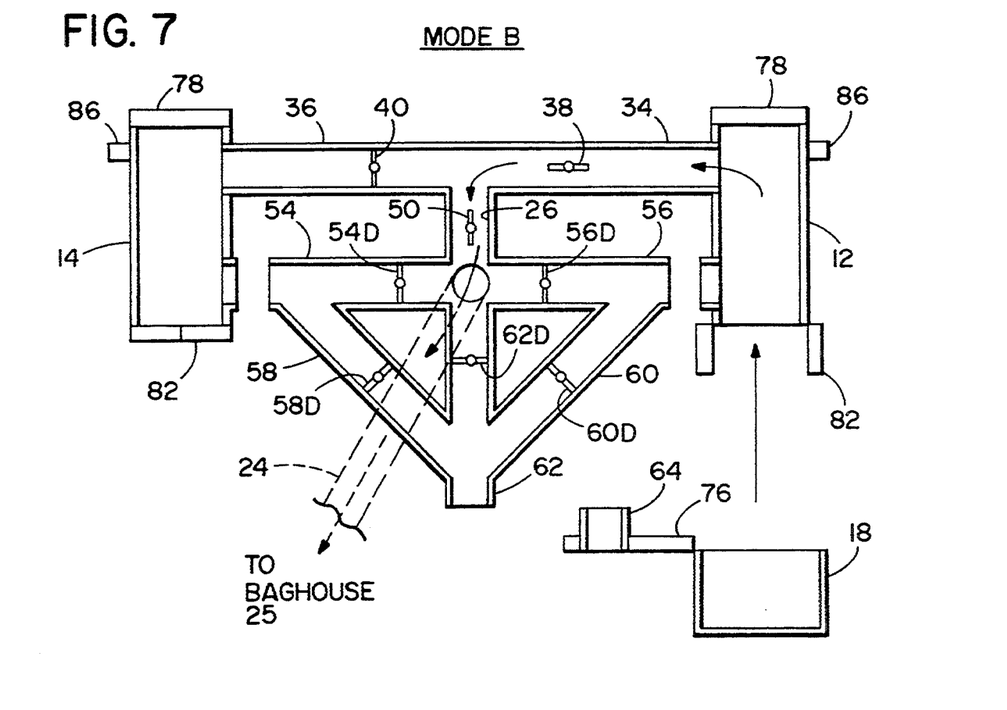
FIG. 7 is a schematic representation of the preheat system of FIG. 2, showing the damper positions when the first preheat vessel is charging the furnace.

At this point, the dampers are preferably in the positions shown in FIG. 7, which is labelled "Mode B".

When the turret 16 is pivoted 90°, as shown in FIG. 2, none of the fixed ductwork system 52 (none of the lower ducts 54, 56, 58, 60, 62) are connected to the vessels 12, 14 or to the furnace 18, and all the dampers 54D, 56D, 58D, 60D, 62D in the fixed ductwork system are closed. The damper 40 in the second upper duct 36 is also closed. The only dampers that are open are the damper 38 in the first upper duct 34, and the damper 50 in the upper conduit 26 of the turret 16. In this mode, the gas coming up out of the furnace 18 as the scrap is charged into the furnace 18 goes directly up, into the open bottom 82 of the first preheat vessel 12, is pulled up through the first upper duct 34, down through the upper conduit portion 26 of the turret 16, through the stationary lower conduit portion 24, and out to the air cleaning system 25. Some of the gas coming out of the furnace 18 may not be caught by the first preheat vessel 12, even though a suction is being pulled through the first preheat vessel 12, and any gas which is not caught by the first preheat vessel 12 will be caught by the canopy 27, shown in FIG. 13, where it is also directed out to the air cleaning device 25. The amount of gas coming up out of the furnace 18 during charging is also reduced from much of the prior art, because the material being charged into the furnace has been preheated, which has already driven off most of the volatile materials. While some gas may still have to be caught by the canopy 27, the volume of gases escaping to the canopy 27 is greatly reduced with this arrangement, both because less gas leaves the furnace 18 and because the gas which leaves the furnace 18 is caught by the ductwork system. The volatiles in the material in the second preheat vessel 14 should already have been driven off by the burner 86 in the Mode A operation. However, the damper 40 in the second upper duct 36 may be left slightly open during this time to ensure that no gases escape from the second preheat vessel 14.

MODE C-LOADING THE PREHEAT VESSEL

As soon as the furnace 18 is charged with the scrap from the first preheat vessel 12, the furnace cover 76 is put back on, realigning the furnace duct 64 with the third forward duct 62, and the turret 16 is pivoted counterclockwise another 90° (180° from the original starting position). This position is shown in FIG. 3. The first preheat vessel 12 (with the first upper duct 34 connected to it) is now in the second preheat position, and the second preheat vessel 14 (with the second upper duct 36 connected to it) is now in the first preheat position. The dampers are moved to the positions shown in FIG. 8, with the first forward damper 58D, the second upper damper 40, and the turret damper 50 open, the second lower damper 56D partially open, and all the other dampers (54D, 38, 60D, and 62D) closed. The melting furnace 18 is now operating, and the off-gases exit the furnace 18 through the furnace duct 64, through part of the third forward duct 62, through the first forward duct 58, into the second preheat vessel 14, pass through the partially preheated scrap in the second preheat vessel 14, and leave through the second upper duct 36, into the upper conduit portion 26, to the lower conduit portion 24, to the treatment system 25.

Figure 8:
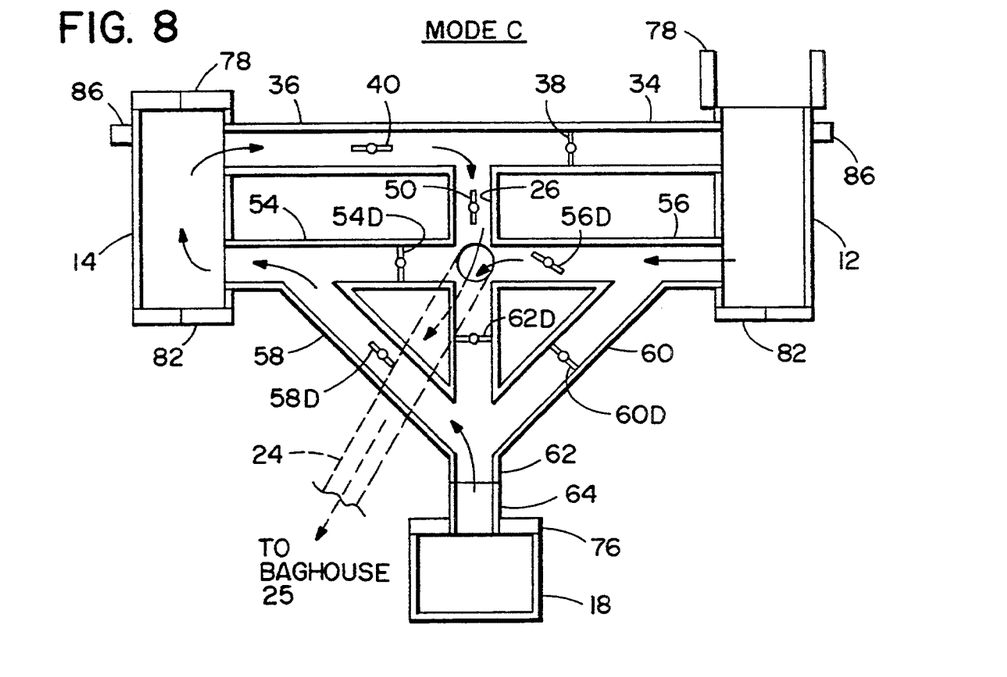
FIG. 8 is a schematic representation of the preheat system of FIG. 3 showing the damper positions when the first preheat vessel is being loaded or charged with material.

At this point, the top 78 of the first preheat vessel is opened, as shown in phantom in FIG. 3. The set-up for charging the first preheat vessel is shown schematically in FIG. 8. A crane or other device (not shown) carrying the scrap to be loaded into the preheat vessel 12 is located over the open top 78 of the preheat vessel 12, and the scrap is dumped into the first preheat vessel 12. The flow of gas through the system is as shown in FIG. 8. The second lower damper 56D is partially opened, applying a draft to the first preheat vessel 12. Since the first preheat vessel 12 is hot, some of the oil in the scrap being loaded into the vessel 12 may volatilize. With the damper 56D slightly open, any fumes will not escape from the top of the first preheat vessel 12 but will, instead, be drawn into the duct 56, to the lower conduit portion 24, and then to the treatment system 25.

Figure 9:
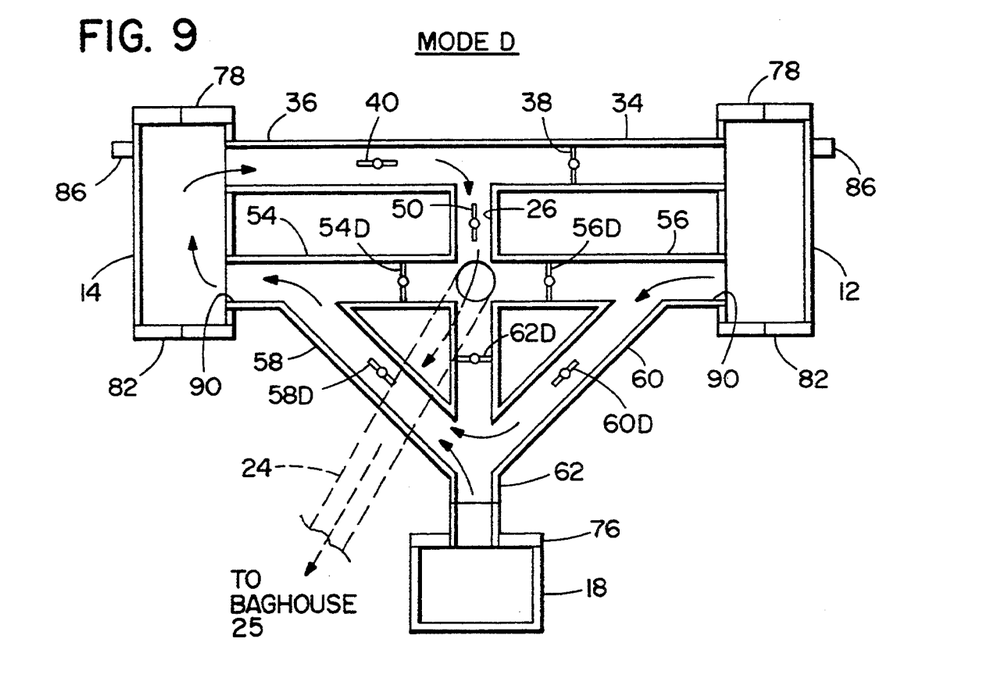
FIG. 9 is a schematic representation of the preheat system of FIG. 3, showing damper positions for the same preheat mode as FIG. 6, but with the second preheat vessel 14 in the first preheat position.

Once the scrap is loaded into the first preheat vessel 12, the top 78 of the first preheat vessel 12 is promptly closed, the dampers are reset, and the preheat process is repeated as shown in FIG. 9.

MODE D-SINGLE VESSEL PREHEAT

Looking now at FIG. 9, the arrangement is exactly as it was in Mode A shown in FIG. 6, except that the first preheat vessel 12 is now in the second preheat position, and the second preheat vessel 14 is now in the first preheat position. As the furnace 18 operates to melt the scrap that was loaded into it in Mode B (shown in FIG. 7), the furnace off-gas goes through the furnace duct 64, through part of the third forward duct 62, through the first forward duct 58, to the bottom of the second preheat vessel 14, where it enters the circulation chamber 88 and then works its way up through the scrap in the second preheat vessel 14 and out the top of the second preheat vessel 14 through the second upper duct 36, through the upper conduit portion 26, and out through the lower conduit portion 24 to the baghouse 25.

At the same time, the first preheat vessel 12 is being preheated by its gas burner 86 to drive off any volatiles, and these gases leave the first preheat vessel 12 through the bottom opening 90, through a portion of the second lower duct 56, into the second forward duct 60, through the first forward duct 58, and into the second preheat vessel 14, travelling along with the furnace off-gas to the air treatment system 25.

REPEATING THE PROCESS

Once the furnace has finished heating the material inside it, the material may be discharged, or a second charge to be melted may be added before the furnace contents are emptied. In either circumstance, the furnace 18 is again ready to be charged. This time, the charge will come from the second preheat vessel 14, which moves over the top of the furnace 18 after the furnace cover 76 has been opened. In order to move the second preheat vessel 14 over the furnace, the turret 16 must rotate another 90° counterclockwise (270° from the starting position). The second preheat vessel 14 will then open its bottom doors 82A, 82B and charge the furnace, repeating the procedure that was shown in FIGS. 2 and 7, but with the second preheat vessel 14 located over the furnace 18.

As the furnace 18 is charged by the second preheat vessel 14, most of the gases coming up from the furnace 18 enter the open bottom of the second preheat vessel 14, go up through the second preheat vessel, out the second upper duct 36, down through the upper conduit portion 26, the lower conduit portion 24, and out to the air cleaning system 25.

Then the turret rotates another 90° counterclockwise, (360° from the original position, thus returning to the original position), the furnace cover closes, and the second preheat vessel 14 is loaded, just as the first preheat vessel was loaded in FIG. 8. As the second preheat vessel is loaded, the furnace is preheating the first preheat vessel 12, with the furnace off-gas passing through the furnace duct 18, through a portion of the third forward duct 62, through the first forward duct 58, into the first lower duct 54, and into the lower opening 90 of the first preheat vessel 12, through the scrap in the first preheat vessel 12, out the first upper duct 34, through the turret duct 26, through the lower conduit portion 24, and out to the treatment system 25. Any volatiles from the scrap being loaded into the second preheat vessel 14 will pass down through the partially-opened damper 56D and out through the lower conduit portion 24 to the treatment system 25. Once the second preheat vessel 14 is loaded, the top 78 is closed, and the dampers are moved to the positions shown in FIG. 6, bringing us back to the starting point.

ALTERNATIVE MODES OF PREHEATING

Figure 11:
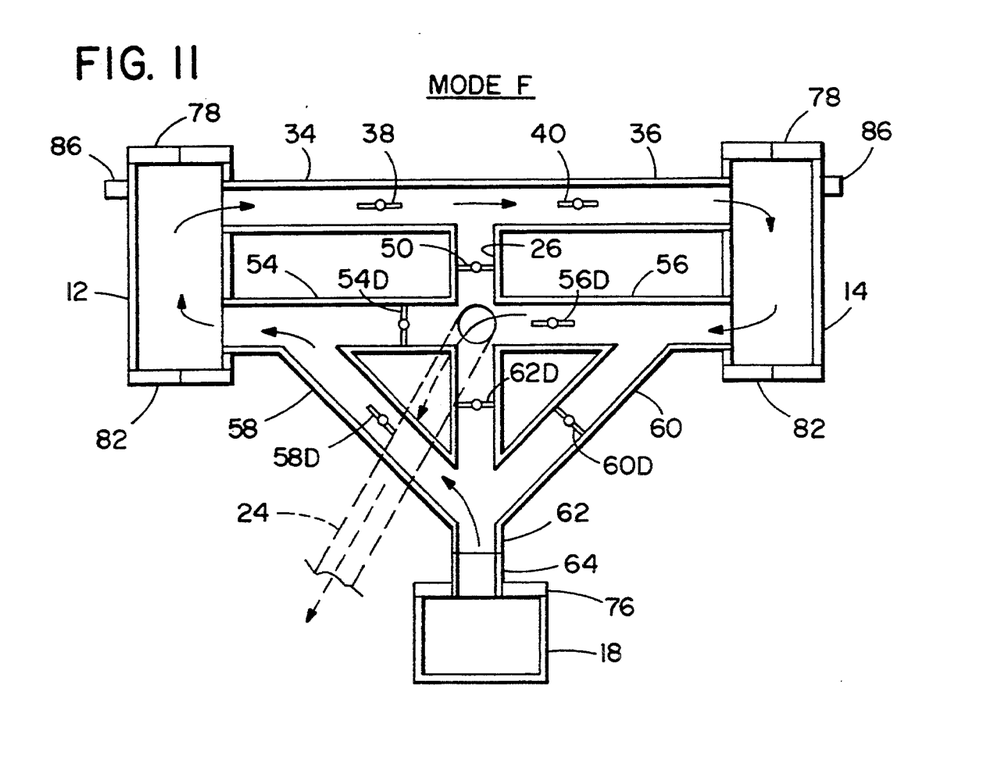
FIG. 11 is a schematic representation of the preheat system of FIG. 1, showing damper positions for a series preheat mode.
Figure 12:
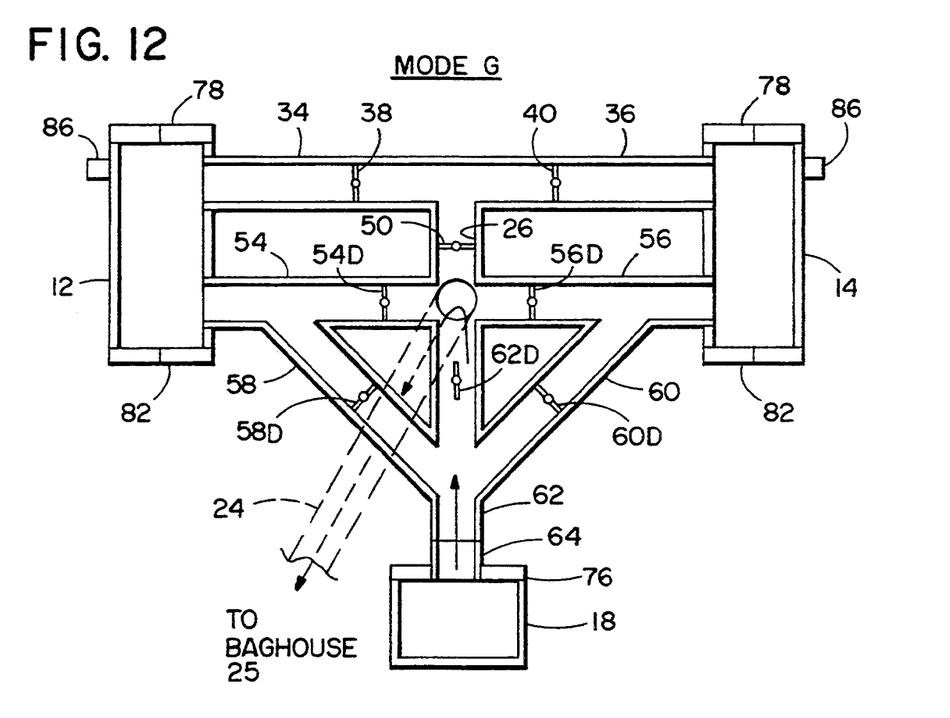
FIG. 12 is a schematic representation of the preheat system of FIG. 1, showing the damper positions for bypassing the preheat system.

Looking again at the turret 16 in the starting position, with the first preheat vessel 12 in the first preheat position and the second preheat vessel 14 in the second preheat position as in FIG. 1, there are a couple of alternative flow paths that the furnace off-gas could take. These are shown in FIGS. 10, 11, and 12, and are labelled as Modes E, F, and G, and these could be used whenever either preheat vessel is in the first preheat position.

MODE E-PARALLEL FLOW

Figure 10:
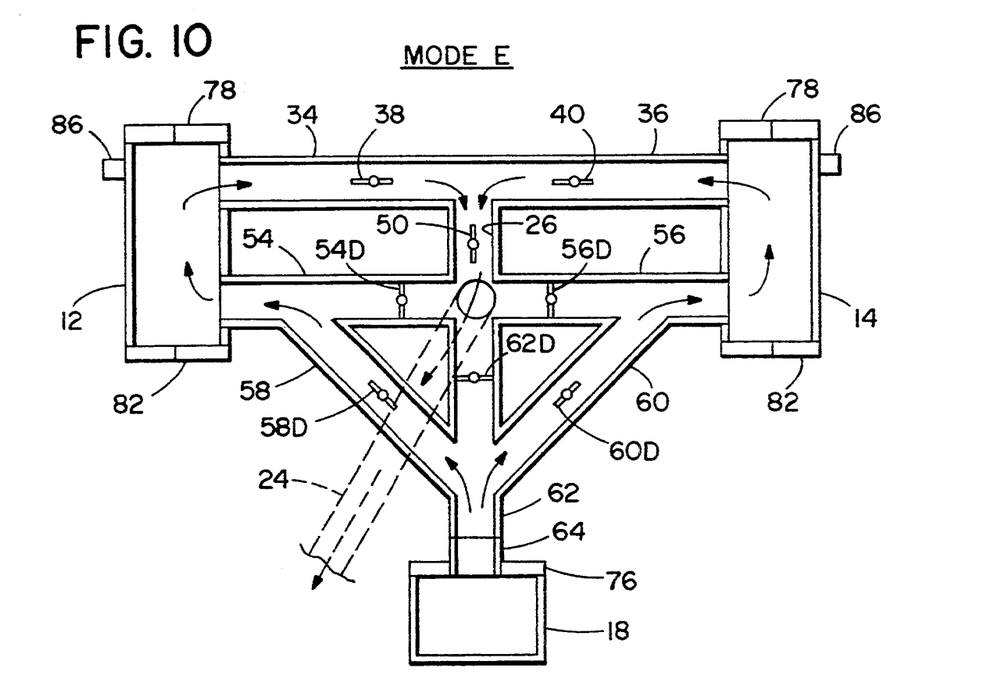
FIG. 10 is a schematic representation of the preheat system of FIG. 1, showing damper positions for a parallel preheat mode of operation.

Looking now at FIG. 10, the first preheat vessel 12 is in the first preheat position, as shown in FIG. 1. The burner 86 in the second preheat position (where the second preheat vessel 14 is) will then be fired for a sufficient time to volatilize most of the oils and greases in the new scrap charge. After this is achieved, however, instead of sending the furnace off-gas only through the vessel in the first preheat position, the furnace off-gas is sent through both preheat vessels in parallel. In FIG. 10, the first and second upper duct dampers 38, 40 are open, the turret damper 50 is open, and the first and second forward duct dampers 58D, 60D are open. The first and second lower duct dampers 54D, 56D and the third forward duct damper 62D are closed.

In this arrangement, the furnace off-gas goes through both the first and second forward ducts 58, 60 to the circulation chambers 88 of both the first and second preheat vessels 12, 14, through the material in those vessels, out of those vessels through the upper ducts 34, 36, down through the turret conduit 26 and the lower conduit 24 to the baghouse or other air treatment device 25. The burners 86 are not usually fired when the vessels are in parallel flow.

MODE F-SERIES FLOW

Another alternative flow path for the furnace off-gas is shown in FIG. 11, in which the off-gas goes through the two vessels in series, passing first through the vessel in the first preheat position, then through the vessel in the second preheat position, then out for treatment. In this arrangement, the upper duct dampers 38, 40 are open, the second lower duct damper 56D is open, the first forward duct damper 58D is open, and the other ducts 50, 54D, 62D, 60D are closed.

With the dampers arranged as shown, the gas flows through the system as shown by the arrows. The off-gas leaves the furnace duct 64 and goes through the first forward duct 58 to the circulation chamber 88 of the preheat vessel 12 in the first preheat position. It works its way up through the material in that preheat vessel 12, preheating the material, and then passes through the upper ducts 34, 36 to the preheat vessel 14 in the second preheat position. The off-gas then passes downward through the material in the second preheat vessel 14, out the bottom opening 90 of the second preheat vessel 14, through the second lower duct 56, to the lower conduit 24, and out to the air treatment system 25. The burners 86 on the preheat vessels 12, 14 are not used in this mode.

MODE G-BYPASS MODE

The bypass mode is shown in FIG. 12. The preheat vessels 12, 14 are again in the first and second preheat positions, respectively. All the dampers are closed except the third forward duct damper 62D. This sends the furnace off-gas directly through the third forward duct 62, to the lower conduit 24, and out to the air treatment system 25. This is not a normal operating mode but might be used in unusual circumstances if operating or maintenance conditions warrant.

It should be clear that the parallel flow mode, the series flow mode, and the bypass mode could all be used if the positions of the preheat vessels were reversed, with the first preheat vessel 12 in the second preheat position and the second preheat vessel 14 in the first preheat position.

It will be obvious to those skilled in the art that modifications may be made to the embodiment described above without departing from the scope of the present invention.

What is claimed is:

1. A preheat system for a furnace, where furnace off-gases are ultimately sent to an air treatment system, comprising:
    first and second angularly-spaced preheat vessels for holding material to be preheated, said first and second preheat vessels each having a closable bottom opening for substantially impeding the entry of air when closed and for depositing the material into the furnace when open;
    each of said first and second preheat vessels being mounted on a rotatable member which rotates them to a position over the furnace for charging the furnace as well as to a position for preheating the material in the preheat vessels and to a position for loading material into the preheat vessels; and
    ductwork from the furnace to said first and second preheat vessels so as to selectively vent off-gases to said first and second preheat vessels.

2. A preheat system as recited in claim 1, wherein said first and second preheat vessels are mounted on the same rotatable member; said first and second preheat vessels each define a first duct opening and a second duct opening; and said rotatable member defines a central conduit which communicates with said duct openings and with an air treatment system.

3. A preheat system as recited in claim 2, wherein said ductwork is adapted to send furnace off-gases to the preheat vessels in several different modes, including a parallel mode, in which the off-gases go through the first and second preheat vessels at the same time and, after leaving said preheat vessels, go to an air treatment system, and a series mode, in which the off-gases go first through one of the preheat vessels, then into the other of the preheat vessels, and then, after passing through both preheat vessels, out to the air treatment system.

4. A preheat system as recited in claim 2, wherein said ductwork is adapted to send furnace off-gases to one of the preheat vessels and then, after leaving that one preheat vessel, out to an air treatment system.

5. A preheat system as recited in claim 4, wherein said preheat vessels include burners for preheating material when the furnace off-gases are not passing through them.

6. A preheat system as recited in claim 2, wherein the ductwork is configured so as to permit a bypass mode, in which furnace off-gases bypass the preheat vessels and go directly to the air treatment system.

7. A preheat system as recited in claim 1, wherein each of said preheat vessels is in fluid communication with ductwork to the air treatment system as it charges the furnace, such that most gases escaping the furnace during charging enter the closable bottom opening of the preheat vessel which is charging the furnace and are drawn through the ductwork to the air treatment system.

8. A preheat system as recited in claim 1, wherein each preheat vessel is in fluid communication with ductwork to the air treatment system when it is in the position to be loaded with material, so that most gases which are emitted while the preheat vessel is being loaded with material are drawn through the ductwork to the air treatment system.

9. A preheat system as recited in claim 8, wherein, after a preheat vessel is loaded with material, it is closed, so that gases leaving that preheat vessel between a time when the preheat vessel is loaded until the preheat vessel opens to discharge material into the furnace are directed through the ductwork to the air treatment system.

10. A preheat system as recited in claim 1, wherein said preheat system provides a ductwork path from the furnace to at least one preheat vessel at all times that the furnace is in operation, so that all the off-gases from the furnace are used for preheating.

11. A preheat system as recited in claim 2, wherein said preheat vessels are mounted on said rotatable member such that the preheat vessels are located a distance from the rotatable member which is substantially the same as the distance from the furnace to the rotatable member.

12. A preheat system for a furnace, comprising:
    a central rotatable member including a conduit;
    a first preheat vessel including a closable top opening for receiving material and a closable bottom opening for discharging material into the furnace, wherein the entry of air through said top and bottom openings is substantially impeded when said top and bottom openings are closed; said first preheat vessel being mounted on said central rotatable member and in fluid communication with said conduit, such that, as said rotatable member rotates, it puts said preheat vessel directly over the furnace for charging the furnace and then puts said preheat vessel into a loading position for loading the preheat vessel with material and into a preheat position for receiving off-gas from the furnace.

13. A preheat system as recited in claim 12, and further comprising a stationary lower duct and a first upper duct, and a side opening in said preheat vessel, wherein said first preheat vessel is fixed to the first upper duct, which communicates with said conduit and which rotates with said central rotatable member, and, wherein, when it is in a first preheat position, the side opening of said first preheat vessel is aligned with and communicates with said stationary lower duct, at least one of said upper and lower ducts also being in fluid communication with the furnace so as to receive furnace off-gas when the first preheat vessel is in a preheat position.

14. A preheat system as recited in claim 13, and further comprising a second upper duct and a second preheat vessel which is fixed to the second upper duct, which communicates with said conduit and which rotates with said central rotatable member, wherein, said second preheat vessel has a side opening, and, when said second preheat vessel is in a first preheat position, it is also in fluid communication with said stationary lower duct through its side opening.

15. A preheat system for a furnace, as recited in claim 1, wherein each of said first and second preheat vessels comprises:
a preheat vessel body including a receptacle portion adapted to hold material to be preheated, said preheat vessel body also defining a closable top opening at the top of said receptacle portion, a closable bottom opening at the bottom of said receptacle portion, an upper duct opening and a lower duct opening, and a circulation chamber lying outside of said receptacle portion and in fluid communication with said receptacle portion and defining one of said duct openings such that furnace off-gases enter said preheat vessel body by entering the duct opening defined by said circulation chamber, circulate in said circulation chamber, and then enter the receptacle portion of said preheat vessel body before leaving through the other duct opening.

16. A preheat system for a furnace as recited in claim 12, wherein said first preheat vessel defines a first duct opening and a second duct opening; said first and second duct openings both being in fluid communication with said conduit when said first preheat vessel is in the preheat position and at least one of said first and second duct openings being in constant communication with said central rotatable member at all angular positions of said central rotatable member.

17. A preheat system for a furnace in which furnace off-gas ultimately goes to an air treatment system, comprising:
a preheat vessel having a closable top opening for receiving material to be preheated and a closable bottom opening for discharging preheated material; said preheat vessel also defining first and second duct openings and being movable from a loading position in which material is loaded into its top opening to a charging position located over the furnace for discharging preheated material into the furnace through the preheat vessel's bottom opening; to a preheat position, in which off-gas from the furnace goes into the preheat vessel and then to the air treatment system;
ductwork connecting said preheat vessel to the air treatment system, and ductwork connecting said preheat vessel to the furnace, such that gases leaving the furnace when the preheat vessel is discharging material into the furnace pass into the bottom opening of the preheat vessel and into the ductwork to the air treatment system; and such that, in the preheat position, off-gas from the furnace passes into the preheat vessel through said first duct opening, out of the preheat vessel through said second duct opening, and to the air treatment system.

18. A furnace preheat system as recited in claim 17, wherein said ductwork connecting said preheat vessel to the air treatment system is also in place as the preheat vessel is loaded and as the preheat vessel is moved into position over the furnace, so that fumes from the material in the preheat vessel always have an available path through the ductwork to the air treatment system, while the preheat vessel is being loaded, being preheated, being unloaded, and being moved from one position to another.

19. A furnace preheat system as recited in claim 18, wherein said preheat vessel is mounted on a rotatable member and wherein said ductwork to the air treatment system passes through the rotatable member.

* * * * *